US011668316B1

(12) United States Patent
Kilchyk et al.

(10) Patent No.: US 11,668,316 B1
(45) Date of Patent: Jun. 6, 2023

(54) ROTOR FORMED OF MULTIPLE METALS

(71) Applicant: Hamilton Sundstrand Corporation, Charlotte, NC (US)

(72) Inventors: Viktor Kilchyk, Lancaster, NY (US); Brent J. Merritt, Southwick, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/570,696

(22) Filed: Jan. 7, 2022

(51) Int. Cl.
*F04D 29/02* (2006.01)
*F04D 29/28* (2006.01)
*F04D 29/58* (2006.01)
*F04D 25/06* (2006.01)
*F04D 17/10* (2006.01)
*F01D 5/28* (2006.01)

(52) U.S. Cl.
CPC ........... *F04D 29/284* (2013.01); *F04D 17/10* (2013.01); *F04D 25/06* (2013.01); *F04D 29/5853* (2013.01); *F01D 5/28* (2013.01); *F04D 29/023* (2013.01); *F05D 2300/50212* (2013.01)

(58) Field of Classification Search
CPC ...... F04D 29/023; F04D 29/02; F04D 29/026; F04D 29/2227; F04D 29/30; F04D 7/00–08; F01D 5/28–288; F01D 5/14; F01D 5/147; F01D 5/048; F05D 2300/50212; F05D 2300/502; F05D 2300/10–125; F05D 2300/505; F05C 2251/08; F05C 2251/046
See application file for complete search history.

(56) References Cited

U.S. PATENT DOCUMENTS

| 4,619,580 A | * | 10/1986 | Snyder | F01D 5/148 415/12 |
| 6,015,263 A | * | 1/2000 | Morris | F04D 29/388 415/12 |
| 6,240,719 B1 | * | 6/2001 | Vondrell | F01D 25/162 60/797 |

(Continued)

FOREIGN PATENT DOCUMENTS

| DE | 19654092 A1 | * | 7/1998 | ........... F04D 29/247 |
| EP | 0040532 A1 | * | 5/1981 | ........... F04D 29/368 |

(Continued)

OTHER PUBLICATIONS

WO-2013190790—Translation from Espacenet (Year: 2013).*

(Continued)

*Primary Examiner* — J. Todd Newton
*Assistant Examiner* — Behnoush Haghighian
(74) *Attorney, Agent, or Firm* — Carlson, Gaskey & Olds, P.C.

(57) ABSTRACT

A rotor for a machine under this disclosure could be said to include a hub having a plurality of blades extending radially outwardly of the hub. At least one of the hub and the plurality of blades is formed of at least two metal materials. The two metal materials are selected to have different thermal expansion coefficients such that the overall rotor will be more resistant to forces it may experience as temperature or speed increases. There are layers of each of the two metal materials, with an intermediate gradient wherein the two materials are mixed. Alternatively, a shape memory alloy may be used. A method is also disclosed.

13 Claims, 6 Drawing Sheets

(56) References Cited

U.S. PATENT DOCUMENTS

| | | | | |
|---|---|---|---|---|
| 7,025,560 | B2* | 4/2006 | Clark | F16D 9/06 403/2 |
| 7,431,563 | B2* | 10/2008 | Kraemer | F04D 29/023 416/229 A |
| 8,043,684 | B2* | 10/2011 | Shi | B23P 15/006 416/185 |
| 8,092,188 | B2* | 1/2012 | Rosati | F04D 29/368 29/889.71 |
| 8,128,866 | B2* | 3/2012 | Shi | F01D 5/282 416/185 |
| 8,136,999 | B2* | 3/2012 | Mons | F01D 25/164 415/12 |
| 8,573,936 | B2* | 11/2013 | Lafont | F04D 29/324 416/223 R |
| 9,169,731 | B2* | 10/2015 | Hui | F04D 29/324 |
| 9,212,667 | B2* | 12/2015 | Sun | F04D 29/464 |
| 9,650,898 | B2* | 5/2017 | Hayford | F02C 3/04 |
| 9,752,442 | B2* | 9/2017 | Hayford | F01D 5/148 |
| 9,759,073 | B1* | 9/2017 | Martin, Jr. | F01D 5/188 |
| 9,868,155 | B2* | 1/2018 | Gerber | B22F 10/28 |
| 9,903,207 | B2* | 2/2018 | Tozzi | B22F 12/10 |
| 9,982,684 | B2 | 5/2018 | Moricca | |
| 10,036,254 | B2 | 7/2018 | Smoke et al. | |
| 10,036,258 | B2* | 7/2018 | Mongillo | F01D 11/08 |
| 10,094,224 | B2* | 10/2018 | Murooka | F01D 5/282 |
| 10,196,898 | B2* | 2/2019 | Kray | F04D 29/324 |
| 10,197,064 | B2* | 2/2019 | Sun | F04D 27/0238 |
| 10,352,173 | B2* | 7/2019 | Prince | F01D 5/147 |
| 10,464,171 | B2 | 11/2019 | Mohr | |
| 10,533,558 | B2* | 1/2020 | Melo | F04D 15/0038 |
| 10,557,464 | B2* | 2/2020 | Scancarello | F04C 18/0246 |
| 10,612,560 | B2* | 4/2020 | Kray | F01D 5/288 |
| 10,634,143 | B2* | 4/2020 | Scancarello | B33Y 70/00 |
| 10,830,249 | B2 | 11/2020 | Pulnikov | |
| 10,920,607 | B2* | 2/2021 | Jain | F01D 11/122 |
| 10,982,672 | B2* | 4/2021 | Scancarello | F04C 18/0215 |
| 11,015,482 | B2* | 5/2021 | Kasal | F01D 25/24 |
| 11,047,387 | B2 | 6/2021 | Wu et al. | |
| 11,116,959 | B2* | 9/2021 | Alexander | A61M 60/814 |
| 11,118,598 | B2* | 9/2021 | Kennedy | F04D 29/281 |
| 11,156,090 | B2* | 10/2021 | Roberge | F01D 5/02 |
| 11,167,351 | B2* | 11/2021 | Paniogue | B22F 10/28 |
| 11,225,871 | B2* | 1/2022 | Kray | F01D 5/148 |
| 11,248,595 | B2* | 2/2022 | Scancarello | F04C 18/0215 |
| 11,286,807 | B2* | 3/2022 | Jain | F01D 5/147 |
| 2006/0104816 | A1* | 5/2006 | Kraemer | F04D 29/023 416/185 |
| 2009/0208752 | A1* | 8/2009 | Shi | B23P 15/006 428/411.1 |
| 2012/0007286 | A1* | 1/2012 | Shi | B23P 15/006 264/603 |
| 2013/0064682 | A1* | 3/2013 | Sun | F04D 15/00 417/18 |
| 2013/0129523 | A1* | 5/2013 | Garrard | F01D 5/048 29/527.1 |
| 2013/0319010 | A1* | 12/2013 | Hui | F01D 5/141 416/232 |
| 2014/0212263 | A1* | 7/2014 | Hayford | F01D 5/148 415/12 |
| 2015/0064015 | A1* | 3/2015 | Perez | B29C 70/70 264/250 |
| 2015/0345396 | A1* | 12/2015 | Zelesky | F23R 3/002 428/221 |
| 2016/0010469 | A1 | 1/2016 | Guo | |
| 2017/0002666 | A1* | 1/2017 | Hayford | F02C 3/04 |
| 2017/0182561 | A1* | 6/2017 | Scancarello | B33Y 10/00 |
| 2017/0184086 | A1* | 6/2017 | Scancarello | F04C 18/0215 |
| 2017/0184108 | A1* | 6/2017 | Scancarello | B22F 3/1103 |
| 2017/0189966 | A1 | 7/2017 | Giannozzi et al. | |
| 2017/0370376 | A1* | 12/2017 | Kray | F01D 5/288 |
| 2018/0172010 | A1* | 6/2018 | Melo | F04D 29/247 |
| 2019/0070664 | A1* | 3/2019 | Paniogue | F02B 33/38 |
| 2019/0234313 | A1 | 8/2019 | Kray et al. | |
| 2019/0321529 | A1* | 10/2019 | Korakianitis | A61M 60/414 |
| 2019/0368361 | A1* | 12/2019 | Kray | F01D 5/288 |
| 2020/0102853 | A1* | 4/2020 | Jain | F01D 11/122 |
| 2020/0141399 | A1* | 5/2020 | Scancarello | F04C 18/0215 |
| 2020/0217321 | A1* | 7/2020 | Scancarello | F04C 29/04 |
| 2021/0025405 | A1* | 1/2021 | Kobielski | F04D 29/584 |
| 2022/0234106 | A1* | 7/2022 | Paniogue | B22F 10/28 |

FOREIGN PATENT DOCUMENTS

| | | | |
|---|---|---|---|
| JP | 2019138443 A | 8/2019 | |
| JP | 2019138444 A | 8/2019 | |
| WO | WO-2013190790 A1 * | 12/2013 | F04D 13/12 |
| WO | 2021/055803 A1 | 3/2021 | |

OTHER PUBLICATIONS

DE-19654092—Translation from Espacenet (Year: 1998).*

Wei, C., Zhang, Z., Cheng, D., Sun, Z Zhu, M. and Li, L. (2020). An overview of laser-based multiple metallic material additive manufacturing: from macro-to micro-scales. International Journal of Extreme Manufacturing 3 (2021) 012003. pp. 1-25.

Video: How Does a Bimetal Thermostat Work? Know How Now Published to YouTube Jun. 14, 2018. Retrieved Jan. 7, 2022 from https://www.youtube.com/watch?v=cKwHRSFVGck.

Video: Bimetallic Temperature Switch (Thermostat) Operation. Rockz Automation. Published to YouTube Nov. 7, 2018. Retrieved Jan. 7, 2022 from https://www.youtube.com/watch?v=aKqno40I3_k.

Aboulkhair, N.T., Simonelli, M., Parry, L., Ashcroft, I., Tuck, C., Hague, R. (2019). 3D Printing of Aluminum alloys: Additive Manufacturing of Aluminum alloys using selective laser melting. Progress in Materials Science 106 (2019) 100578. pp. 1-45.

Fairclough, C. (2018). Advancing Additive Manufacturing with Sequential Simulations. Mar. 7, 2018. pp. 1-12. https://www.comsol.com/blogs/advancing-additive-manufacturing-with-sequential-simulations/.

Stapleton, T.J., Krouse, D., Laliberte, Y.J. (2015). Additive Manufacturing Technology to Enhance Environmental Control Life Support (ECLS) Equipment Performance While Reducing Its Weight and Volume. 45th International Conference on Environmental Systems. Jul. 12-16, 2015. pp. 1-7.

* cited by examiner

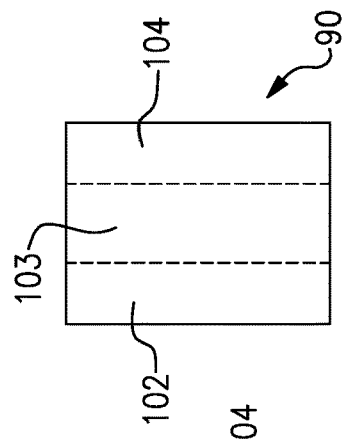
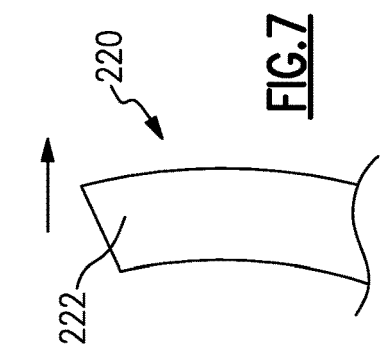
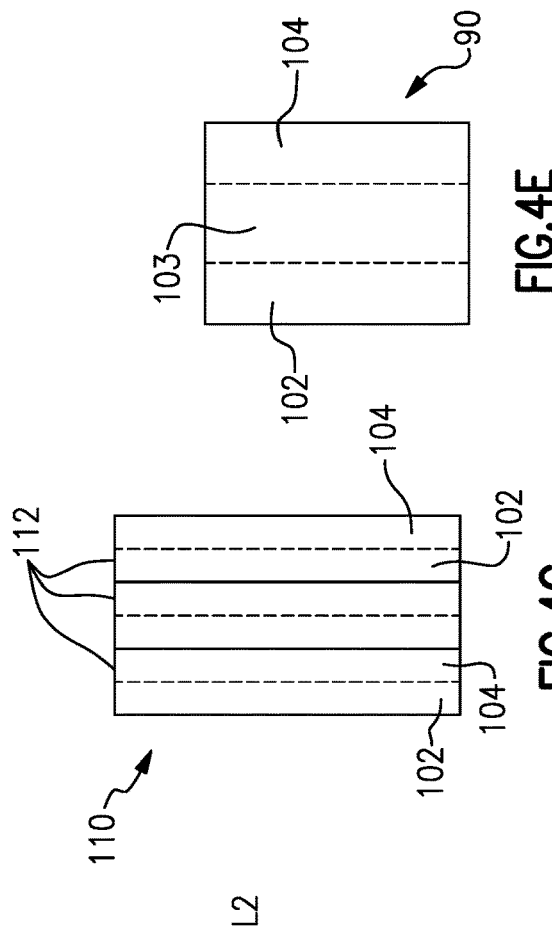
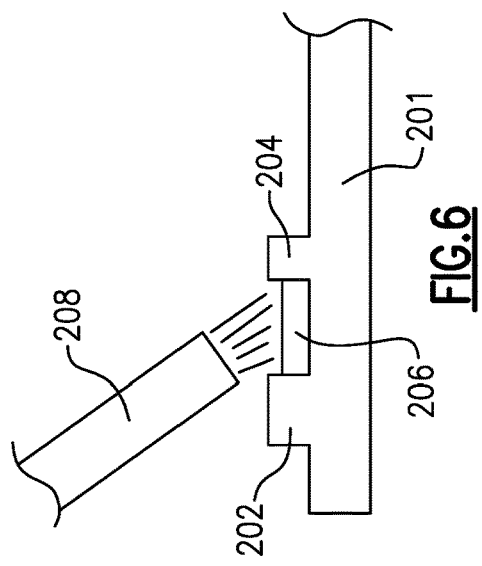
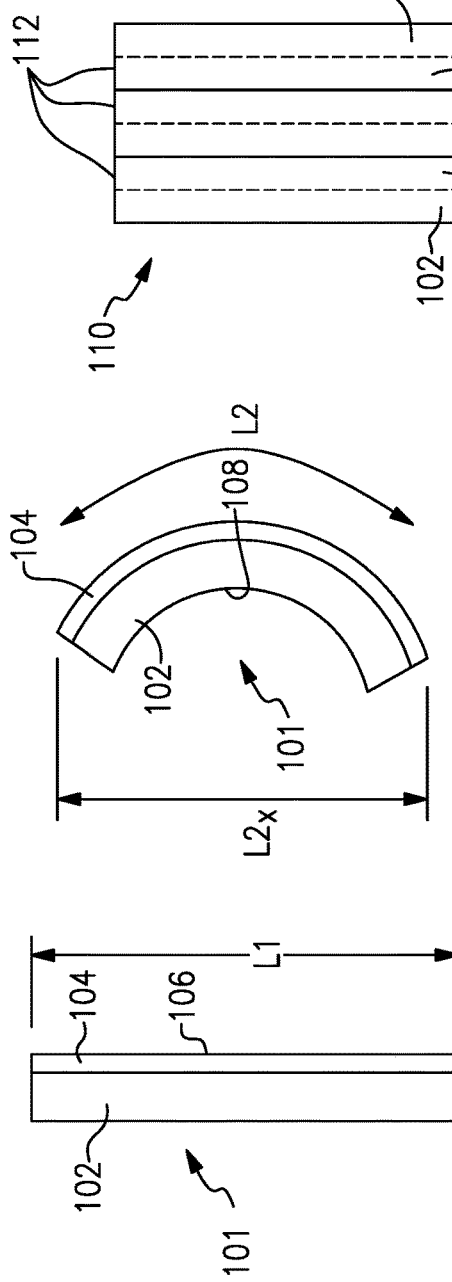
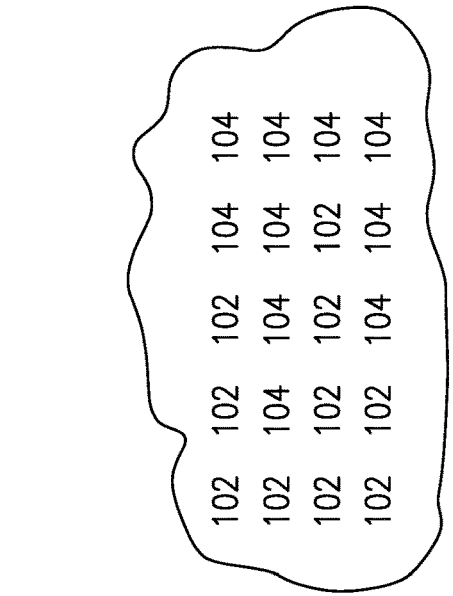

ROTOR FORMED OF MULTIPLE METALS

BACKGROUND

This application relates to a method of forming a rotor, and a rotor, wherein the rotor is formed of at least two distinct metals to result in the rotor being more resistant to forces it may experience.

Rotors are utilized in any number of machine applications. As one example, a compressor to supply air into the cabin of an aircraft is driven by an electric motor. The compressor has a hub and blades extending radially outwardly of the hub. Such compressors can be subject to high temperature and stress.

In the past, such rotors have typically been formed of a single metal.

SUMMARY

A rotor for a machine under this disclosure could be said to include a hub having a plurality of blades extending radially outwardly of the hub. At least one of the hub and the plurality of blades is formed of at least two metal materials. The two metal materials are selected to have different thermal expansion coefficients such that the overall rotor will be more resistant to forces it may experience as temperature or speed increases. There are layers of each of the two metal materials, with an intermediate gradient wherein the two materials are mixed.

In another embodiment a shape memory alloy is used to provide the resistance.

A method is also disclosed.

These and other features of this disclosure will be best understood from the following drawings and specification, the following is a brief description.

BRIEF DESCRIPTION OF THE DRAWINGS

FIG. 4A shows a structure which is incorporated into rotors made under this disclosure.

FIG. 4B shows a subsequent position of the rotor once exposed to heat.

FIG. 4C shows another embodiment.

FIG. 4D shows a feature.

FIG. 4E shows another embodiment.

FIG. 6 schematically shows a method of manufacturing the rotor.

FIG. 7 shows a distinct embodiment.

DETAILED DESCRIPTION

Figure 1:
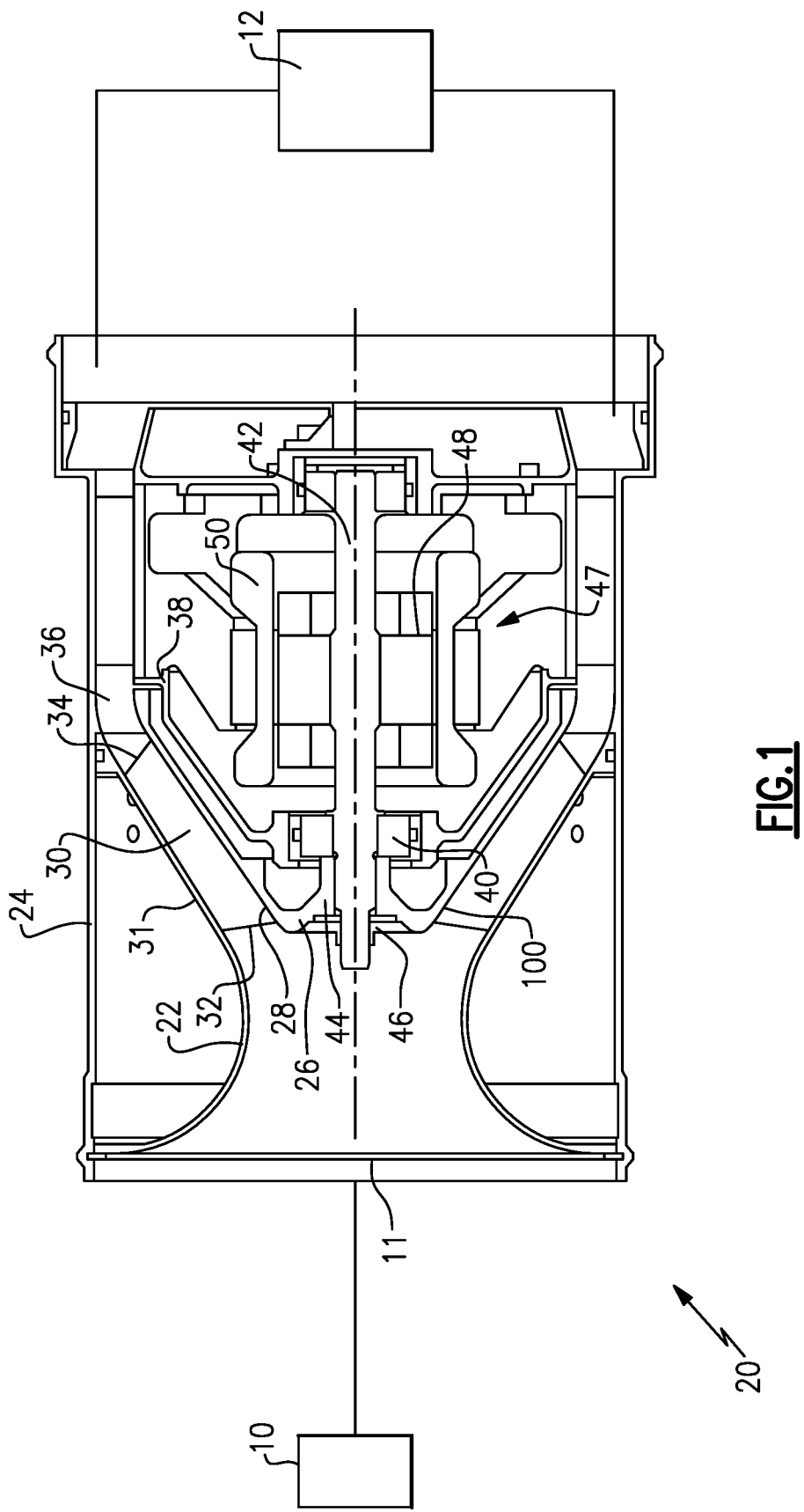
FIG. 1 schematically shows a compressor system.

FIG. 1 shows a fan system 20. A source 10 delivers gas to an inlet 11 in a fan housing 22. The gas may be air. The air approaches a rotor 26 having a hub 100 with an outer surface at 28. A plurality of fan blades 30 have a leading edge 32 and a trailing edge 34. A shroud 31 surrounds rotor 26. A diffuser housing 38 is aft of the impeller 26. An electric motor 47 has a rotor 48 and a stator 50. The rotor 48 is driven to rotate, as known, and drives a shaft 42. Shaft 42 is secured to rotor 26 with a connection shown at 44, and including a nut 46. A bearing 40 supports the shaft 42. Rotor 26 moves air to outlet 36. In one application source 10 is an aircraft cabin that recirculates air back into a use 12 that may be a mixing chamber where it is mixed with air from an air cycle machine. The mixed air is returned to the aircraft cabin.

Figure 2:
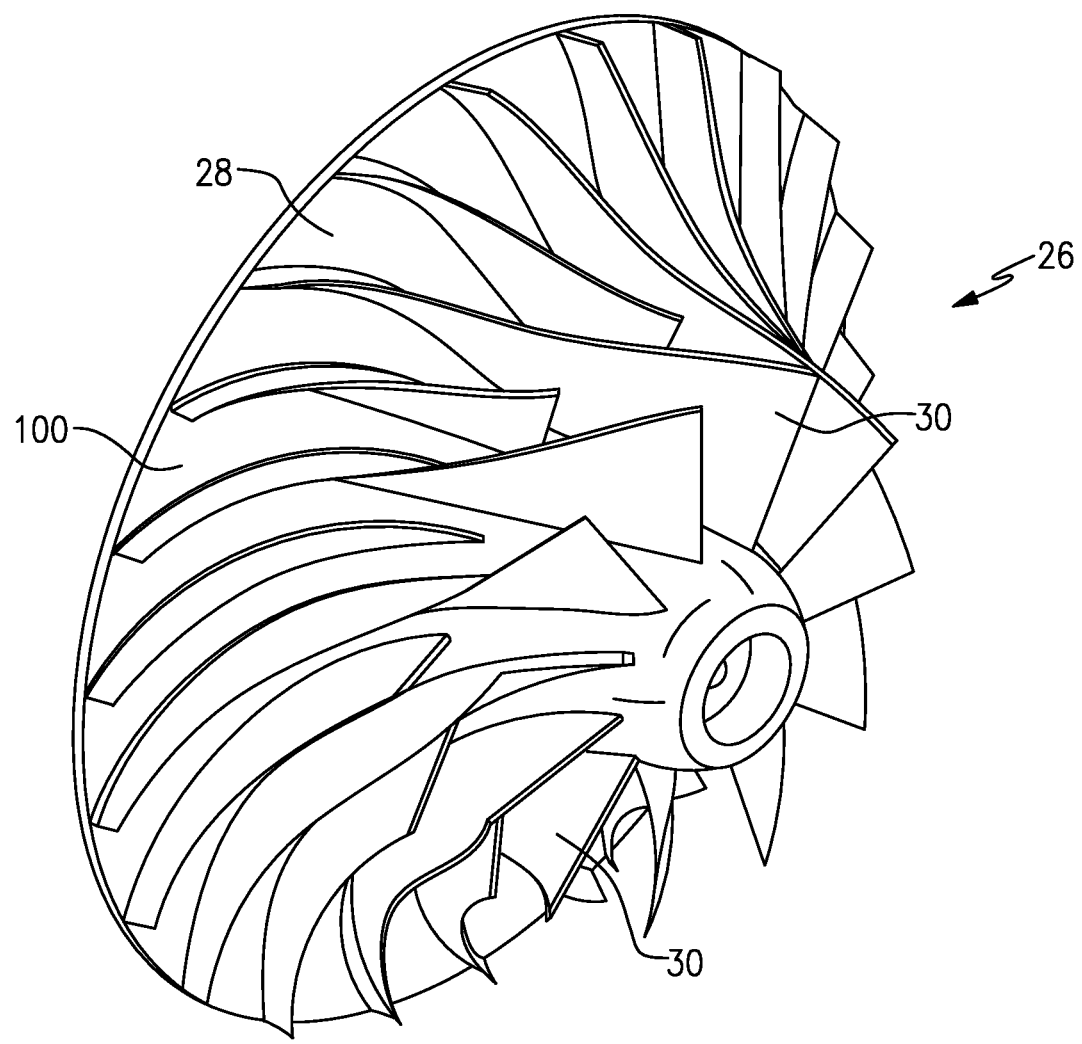
FIG. 2 shows a rotor as may be incorporated into the compressor system.

As shown in FIG. 2 rotor 26 includes hub 100 and blades 30 attached to and extending outward from hub 100.

Figure 3A:
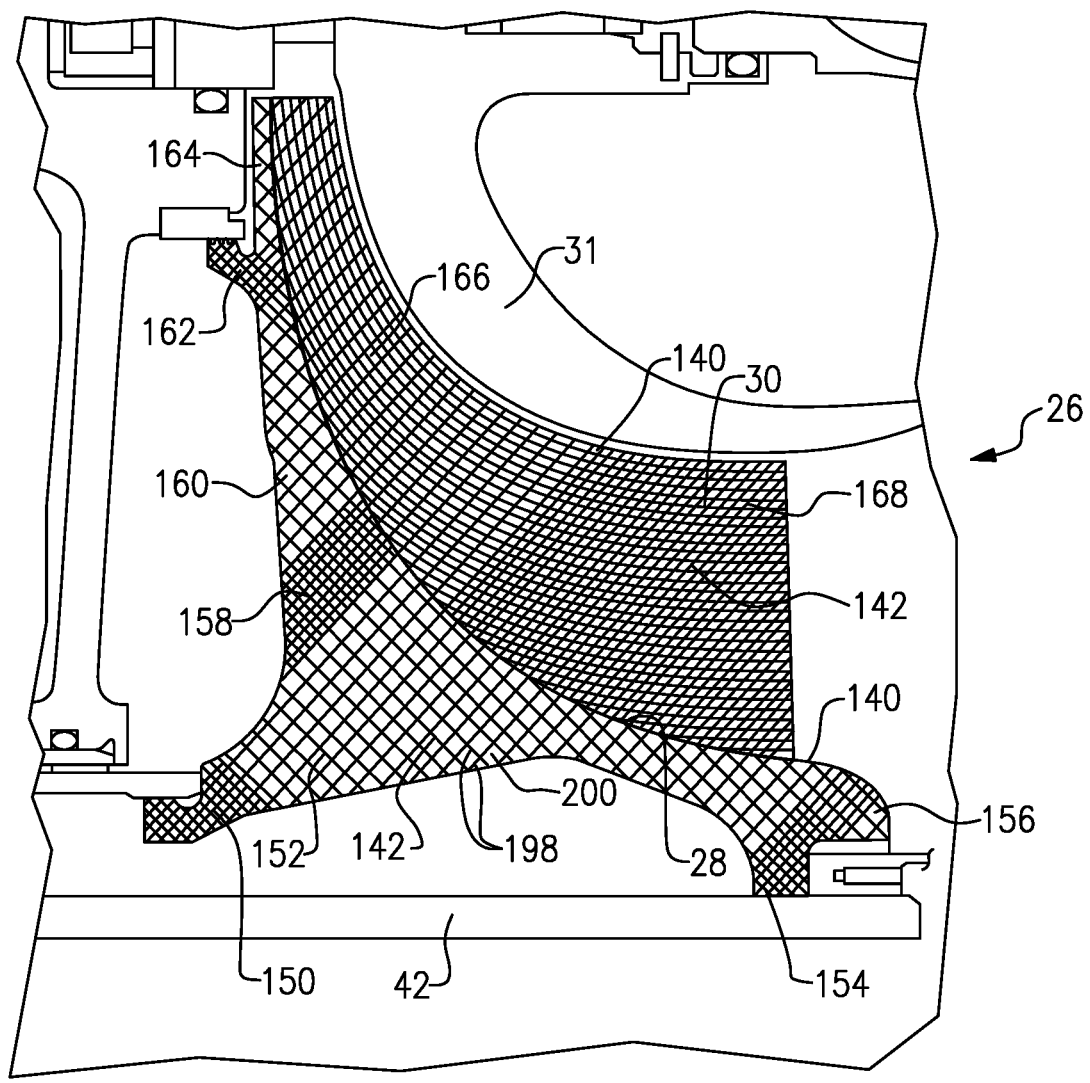
FIG. 3A is a cross-sectional view through the rotor.

FIG. 3A shows hub 100 and blades 30 each including exterior surface 140 that surrounds lattice structure 142 in an interior of hub 100 and blades 30. Exterior surface 140 is a solid, continuous surface. Lattice structure 142 is a varying lattice structure. Lattice structure 142 has regions with varying densities. As shown, lattice structure 142 has first region 150, second region 152, third region 154, fourth region 156, fifth region 158, sixth region 160, seventh region 162, and eighth region 164 in hub 100, and ninth region 166 and tenth region 168 in blades 30. The regions have different densities to provide increased stiffness at particular high density locations and lower density at other less challenging areas to reduce weight. Lattice structure 142 may vary gradually or abruptly between regions. Lattice structure 142 includes members 198 arranged in a 3D crisscrossing pattern with voids 200 between the members.

As shown, lattice structure 142 varies in density by having a varying distribution of the members 198 and voids 200 of lattice structure 142. In alternate embodiments, lattice structure 142 can vary in density by varying the thickness of the members 198, by having varying geometrical configurations, and/or by varying fillet radii on joints between the members.

In the embodiment shown in FIG. 3A, first region 150, third region 154, fifth region 158, seventh region 162, ninth region 166, and tenth region 168 have a greater density than second region 152, fourth region 156, sixth region 160, and eighth region 164. Rotor 26 is additively manufactured, allowing lattice structure 142 to be manufactured with different densities in different areas of rotor 26. Any suitable additive manufacturing process (also known as a 3D printing process) can be used to manufacture rotor 26, including, for example, direct metal laser sintering, electron beam freeform fabrication, electron-beam melting, selective laser melting, or selective laser sintering. Rotor 26 can be made out of any material that can be used in an additive manufacturing process, including any of stainless steel, corrosion-resistant steel, nickel-chromium alloy, titanium, aluminum, synthetic fiber, fiberglass, composites, and combinations thereof.

Traditional rotors for rotary machines have solid cross-sections and are manufactured by forging and/or subtractive manufacturing processes, such as hogout. Additively manufacturing rotor 26 allows lattice structure 142 to be used in rotor 26. Using lattice structure 142 in rotor 26 allows rotor 26 to have a reduced weight compared to traditional rotors, as there are voids 200 between the lattice structure. At the same time, rotor 26 will have an equivalent strength as traditional rotors due to the increased strength of lattice structure 142.

Further, the density of lattice structure 142 is varied to optimize mechanical properties of rotor 26 locally and generally. Mechanical properties of rotor 26, such as stress, strain, and stiffness can be optimized to improve the performance of rotor 26 by reducing stress in high stress regions of rotor 26 and reducing strain and increasing stiffness in deflection regions of rotor 26. Reducing stress and strain in local regions of rotor 26 can also reduce stress and strain in rotor 26 generally. Reducing the stresses in high stress regions can reduce the failure rate of rotor 26 and, thus, the failure rate of cabin air compressor 10. Reduced failure rates result in reduced down time, reduced repairs, and reduced costs. Reducing the strain and increasing the stiffness in deflection regions can reduce the tolerances between blades 30 of rotor 26 and shroud 31.

Reducing the tolerances between blades 30 of rotor 26 and shroud 31 increases the compression efficiency of cabin air compressor 10, as more air is forced through rotor 26 and into diffuser 38.

Figure 3B:
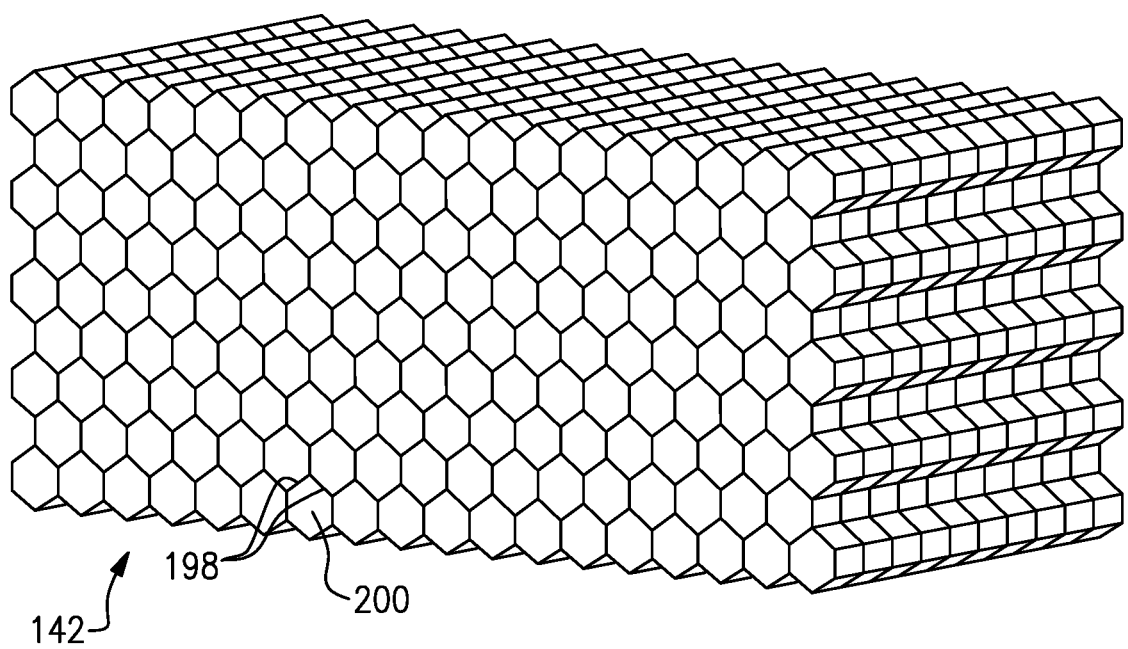
FIG. 3B shows internal details of the rotor.

FIG. 3B shows the lattice structure 142 having crossing members 198 creating the voids 200 between the members.

A rotor formed with the above structure is disclosed and claimed in U.S. patent application Ser. No. 17/472,121, entitled "TURBOMACHINERY ROTOR WITH VARIABLE LATTICE DENSITIES" and filed on Sep. 10, 2021. This prior application has a common applicant with the instant application. Further details with regard to the method and structure of the systems in the above-referenced application are hereby incorporated by reference.

While a rotor having the lattice structure as set forth above does have good qualities with regard to resisting stresses and strains, there are other features that could be improved. FIG. 4A shows a portion 101 of a rotor such as rotor 26. Portion 101 is formed of at least two metals 102 and 104 having distinct thermal expansion coefficients. In the illustrated embodiment, the material 104 has a larger thermal expansion coefficient than does material 102. As shown in FIG. 4A, when the section 101 is cool the edges of the portion 101 may be straight as shown at 106.

However, when exposed to heat, the side 104 will expand to a greater length than does the side 102. As an example, in FIG. 4A each of the material portions 102 and 104 have an initial length L1 whereas the expanded material as shown in FIG. 4B has a length $L2_x$ for the side 102 which is less than the length L2 of the side 104. As shown, this causes the portion 101 to bend as shown at curve 108. By incorporating two materials at particular portions of the rotor, the impact of forces during operation on the rotor can be reduced by causing controlled bending.

FIG. 4C shows an application 110 which may be utilized in practice wherein there are a plurality of the sandwiched portions 112. Each of the sandwiched portions 112 are in contact with another sandwich portion, and alternate between materials 102 and 104. This may reduce the amount of movement between any one of the portions.

While the layers 102 and 104 are shown with a distinct and abrupt change, in reality there would be a gradient between the layers. FIG. 4D shows this schematically, with there being outer portions that are pure material 102 and 104, with intermediate layers gradually changing between the two. Techniques for utilizing additive manufacturing for achieving such gradients from bi-metallic materials are known.

FIG. 4E shows a portion embodiment 90 having three types of metals 102, 103 and 104. The thermal expansion coefficient of the material 103 might be selected to be intermediate that of materials 102 and 104. This will reduce the tension between the materials when expansion occurs, as there will not be such a dramatic gradient across the interface of the three materials that might be the case when there are only two materials. There also is a gradient between the first and third metal materials and the second and third metal materials.

Figure 5A:
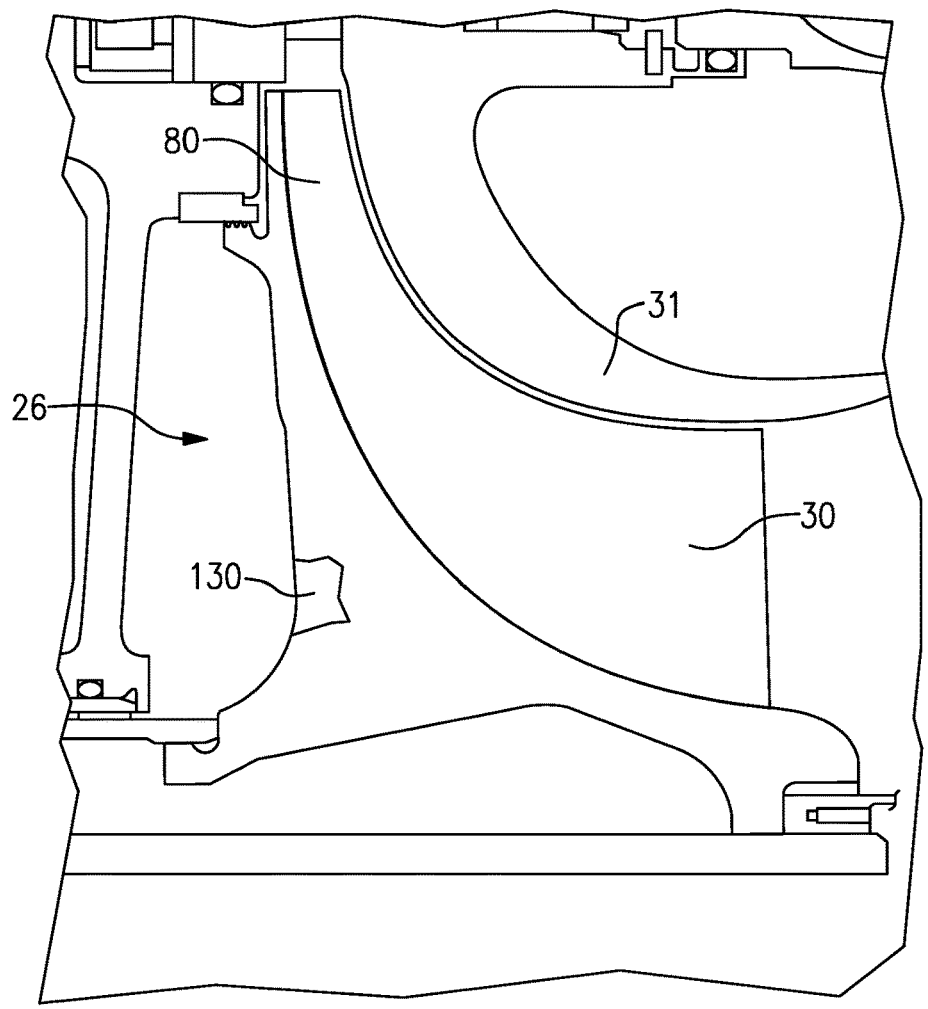
FIG. 5A is a cross-sectional view through the rotor showing further details.

FIG. 5A shows the rotor 26 having a blade 30, a shroud and a "fuse" 130. The fuse 130 is selected such that upon extreme rotational stress the fuse may fracture rather than allowing the compressor to begin rotating at an undesirably high speed. The shroud 31 will catch the fractured rotor portion. By utilizing the dual metals one can tailor the fuse such that it can be controlled to fracture at an accurate force or speed.

Figure 5B:
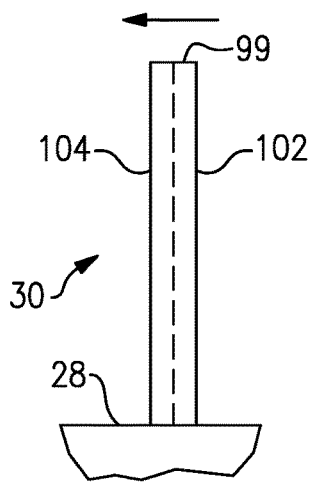
FIG. 5B is a side view of a blade showing further details.

FIG. 5B shows a blade 30 having materials 102 and 104. Such an arrangement might be utilized when a blade tip 99 may be urged to bend to the left as shown in this Figure such as due to centrifugal forces F. By utilizing the material 102 on the opposed side, the blade tip 99 will tend to bend to the right as shown in this Figure and the impact of the force F will thus be reduced.

Figure 5C:
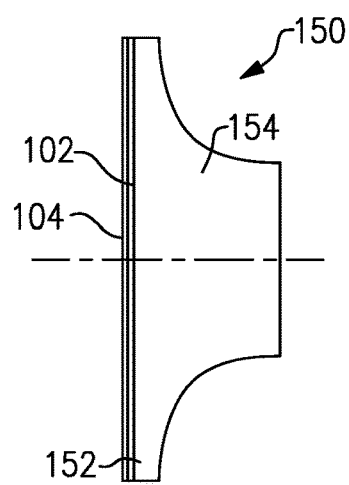
FIG. 5C is a side view of an undeformed rotor and its hub.
Figure 5D:
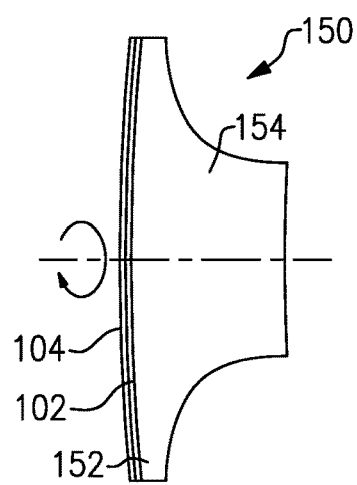
FIG. 5D shows the deformation that the rotor and hub might experience.

FIG. 5C shows an undeformed rotor 150 having a hub 152 and blades 154. When undergoing rotation, the hub will tend to deflect in a direction towards the blades 154 as illustrated in FIG. 5D. Utilizing the layers 102 and 104 will resist this deflection and urge the hub back towards its undeformed position.

The features shown in FIGS. 5B and 5C will result in clearances between the rotor and surrounding housings and seals as designed.

FIG. 6 shows a method of utilizing additive manufacturing to form a rotor according to this disclosure. An intermediate portion 201 has sections 202 and 204, which may be formed such as by material 102. An additive manufacturing tool 208 is shown laying down material to form the intermediate section 206. Intermediate section 206 may be formed of the material 104. This is of course a simplification of the process; however, additive manufacturing processes are known. In embodiments, laser powder fusion additive manufacturing may be used.

Additive manufacturing involves manufacturing rotor 26 layer by layer. Additive manufacturing processes allow complex internal and external shapes and geometries to be manufactured that are not feasible or possible with traditional manufacturing. A typical additive manufacturing process involves using a computer to create a three-dimensional representation of rotor 26. The three-dimensional representation will be converted into instructions which divide rotor 26 into many individual layers. These instructions are then sent to an additive manufacturing device. This additive manufacturing device will print each layer, in order, and one at a time until all layers have been printed. Any additive manufacturing process can be used, including direct metal laser sintering, electron beam freeform fabrication, electron-beam melting, selective laser melting, selective laser sintering, or other equivalents that are known in the art.

The metal powders can be made of a material selected from the group consisting of stainless steel, corrosion-resistant steel, nickelchromium alloy, titanium, aluminum, and combinations thereof. This powder may be laid down by a roller, pressurized gas, or other equivalents (collectively tool 208) that are known in the art. This powder may have any grain size, wherein the grain size of the powder affects the unprocessed surface properties of rotor 26.

A portion of the layer of powder 202, 204, 206 can be solidified by applying energy to layer of powder. Any energy source can be used, including laser beam, electron beams, or other equivalents that are known in the art. The application of this energy will solidify the powder in a specific configuration. The specific configuration of solidified metal will be entirely dependent on which layer the process is currently at.

This specific configuration will be in a specific shape and distribution so that when combined with the other layers, it forms rotor 26.

While the application has been specifically disclosed to a compressor rotor having lattice structure, the broader idea of utilizing the differing coefficients of thermal expansion could apply to rotors for other application. Also, while the specific rotor 26 is shown to have hollow lattice structure, other hollow structures, such as ribs, may be utilized in a rotor that benefits from this disclosure. In fact, benefits of this disclosure might extend to solid rotors.

FIG. 7 schematically shows a rotor 220 wherein the rotor body is formed of a shape memory alloy. If the shape memory alloy is deformed such as illustrated in FIG. 7 in a counter-clockwise direction, the shape memory will urge the rotor back to its undeformed position. The benefits of such a structure are similar to the benefits of the bi-metallic rotors disclosed above.

A rotor for a machine under this disclosure could be said to include a hub having a plurality of blades extending radially outwardly of the hub. At least one of the hub and the plurality of blades is formed of at least two metal materials. The two metal materials are selected to have different thermal expansion coefficients such that the overall rotor will be more resistant to forces it may experience as temperature or speed increases. There are layers of each of the two metal materials, with an intermediate gradient wherein the two materials are mixed.

A rotor for a machine under another embodiment could be said to include a hub having a plurality of blades extending radially outwardly of the hub. At least one of the hub and the plurality of blades are formed of a shape memory alloy, such that the at least one of the hub and the plurality of blades resist deformation as the rotor is exposed to an increased temperature or speed.

A method of forming a rotor under this disclosure could be said to include the steps of laying down material in layers to form an intermediate body, and of a first metal material. A layer is formed of a second metal material in contact with a portion formed of the first metal material. The two metal materials are selected to have different thermal expansion coefficients such that the overall rotor will be more resistant to forces it may experience as temperature or speed increases. There are layers of each of the two metal materials, with an intermediate gradient wherein the two materials are mixed.

While the rotor is shown in one application, as a fan for an aircraft cabin, other rotor applications may benefit from this disclosure. Examples may include compressor or turbine rotors. While an aviation application is disclosed, the disclosure may benefit rotor in turbomachinery, or military systems, especially those with limited cycles, such as missile systems.

While embodiments have been disclosed, a worker of skill in this art would recognize that certain modifications would come within the scope of this disclosure. For that reason, the following claims should be studied to determine the true scope and content.

What is claimed is:

1. A rotor for a machine comprising:
   a hub having a plurality of blades extending radially outwardly of said hub;
   at least one of said hub and said plurality of blades is formed of at least two metal materials, the two metal materials have different thermal expansion coefficients and there being layers of each of the two metal materials, with an intermediate gradient wherein the two materials are mixed; and
   wherein the hub is formed of the at least two metal materials positioned to resist bending of the hub in a direction towards the blades.

2. The rotor as set forth in claim 1, wherein an electric motor is connected to drive the rotor.

3. The rotor as set forth in claim 1, wherein voids are formed within a body of at least one of said hub and said blades formed.

4. The rotor as set forth in claim 3, wherein said voids are formed by a lattice structure.

5. The rotor as set forth in claim 3, wherein said voids are formed within each of said hub and said plurality of blades.

6. The rotor as set forth in claim 1, wherein the two metal materials are utilized to form at least said plurality of blades.

7. The rotor as set forth in claim 6, wherein the two metal materials are selected such that said blades bend upon exposure to heat in a direction that opposes a bending centrifugal force on the blades.

8. The rotor as set forth in claim 7, wherein the two metal materials form at least a tip of the blades to resist deformation due to centrifugal force.

9. The rotor as set forth in claim 1, wherein the two metal materials form at least a part of said hub.

10. A rotor for a machine comprising:
    a hub having a plurality of blades extending radially outwardly of said hub;
    at least one of said hub and said plurality of blades is formed of at least two metal materials, the two metal materials have different thermal expansion coefficients and there being layers of each of the two metal materials, with an intermediate gradient wherein the two materials are mixed;
    wherein the hub is formed of the at least two metal materials positioned to resist bending of the hub in a direction towards the blades;
    wherein the two metal materials form at least a part of said hub; and
    wherein the hub has a fuse that will be caused to fracture should the hub be exposed to at least one of a force, or speed that is beyond a predetermined desired maximum, said at least two metal materials causing said fuse to fracture at the predetermined desired maximum.

11. A rotor for a machine comprising:
    a hub having a plurality of blades extending radially outwardly of said hub;
    at least one of said hub and said plurality of blades is formed of at least two metal materials, the two metal materials have different thermal expansion coefficients and there being layers of each of the two metal materials, with an intermediate gradient wherein the two materials are mixed; wherein the hub is formed of the at least two metal materials positioned to resist bending of the hub in a direction towards the blades; and
    wherein there are a plurality of sandwiched portions of the at least two metal materials which are sandwiched together, such that there are repeating adjacent sandwich portions of a first of said at least two metal materials and a second of said at least two metal materials.

12. The rotor as set forth in claim 11, wherein there is at least a third metal material positioned between a layer of said first of said at least two metal materials and said second of said at least two metal materials with a thermal expansion coefficient of said third metal material being intermediate the thermal expansion coefficients of the first and second metal materials, and there also being a gradient between the first and third metal materials and the second and third metal materials.

13. The rotor as set forth in claim 1, wherein there is at least a third metal material positioned between a layer of a first metal material and said second metal material with a thermal expansion coefficient of said third metal material being intermediate the thermal expansion coefficients of the first and second metal materials, and there also being a gradient between the first and third metal materials and the second and third metal materials.

\* \* \* \* \*